United States Patent [19]
Wilson et al.

[11] Patent Number: 5,551,554
[45] Date of Patent: Sep. 3, 1996

[54] CONVEYOR WITH DISCONTINUOUS TURN

[75] Inventors: Quentin L. Wilson, Big Island; George H. Dawson, III, Madison Heights, both of Va.

[73] Assignee: Simplimatic Engineering Company, Lynchburg, Va.

[21] Appl. No.: 419,830

[22] Filed: Apr. 11, 1995

[51] Int. Cl.$^6$ .................................................. B65G 47/74
[52] U.S. Cl. ........................ 198/636; 198/637; 198/367
[58] Field of Search ........................ 198/606, 636, 198/367, 367.1, 457, 599, 637, 370.01

[56] References Cited

U.S. PATENT DOCUMENTS

| | | |
|---|---|---|
| 2,331,217 | 10/1943 | Mitchell . |
| 2,835,370 | 5/1958 | Warrington ........................ 198/367 X |
| 3,253,696 | 5/1966 | Szatkowski et al. ................ 198/599 X |
| 3,363,741 | 1/1968 | Dierksheide . |
| 3,517,925 | 6/1970 | Hütz . |
| 3,643,781 | 2/1972 | Risley et al. ........................ 198/606 X |
| 3,701,407 | 10/1972 | Kulig . |
| 3,709,353 | 1/1973 | Sheetz . |
| 3,778,959 | 12/1973 | Langen et al. ...................... 198/636 X |
| 3,901,377 | 8/1975 | Euverard et al. . |
| 4,609,092 | 9/1986 | Takai ................................... 198/367 |
| 4,917,230 | 4/1990 | Barchman ......................... 198/457 X |
| 5,067,857 | 11/1991 | Ward .................................. 198/367 X |

OTHER PUBLICATIONS

REXNORD CORPORATION, Grafton, WI, Bulletin #8033, Nov. 1994 5M C.Il, "Dynamic Transfer System™ Eliminates Dead Plates".

*Primary Examiner*—James R. Bidwell
*Attorney, Agent, or Firm*—St. Onge Steward Johnston & Reens

[57] ABSTRACT

The conveyor system of the present invention comprises a first conveyor having an extending edge with a tapered profile, and a second, discontinuously-aligned conveyor, the conveying surface of which is directed below, but in close proximity to, the tapered profile of the first conveyor edge for the direct transfer of articles therebetween.

10 Claims, 2 Drawing Sheets

5,551,554

CONVEYOR WITH DISCONTINUOUS TURN

FIELD OF THE INVENTION

The invention relates to conveyor systems, and more particularly to a conveyor system including a discontinuous turn between two sections of conveyor.

BACKGROUND OF THE INVENTION

Many conveyor systems include discontinuous turns and junctions between two different sections of conveyor. Discontinuous turns are increasingly included in conveyor systems as plant space is at a premium. These discontinuous turns, which are often at right angles, present problems in transferring products from one conveyor to another because of the gap which exists between a side or end of one conveyor section and the conveying surface of an adjacent conveyor section. In prior designs, this gap is filled with a non-moving "deadplate" which bridges the gap between the two conveyors.

The prior art deadplate does not convey articles, it merely provides a surface over which articles may be pushed by the line pressure from upstream articles. When it is desired to end the conveying run of a particular article (to replace it with another or relabeled article), however, line pressure ceases and a few of the old articles or old labels may stall on the deadplate. Stalled articles must be removed from the deadplate to avoid the possibility of mislabeled, mispacked or misfilled articles. Conveyor systems, especially in canning and bottling plants, undergo frequent container and label changes such that elimination of the need to manually remove articles from deadplates reduces the operational and maintenance costs of running conveyor systems.

Some prior designs have sought to overcome this deadplate clearing problem by using a third conveyor or other mechanism to move articles over the discontinuity or gap between the first and second conveying systems. Examples of these types of conveyors are disclosed in U.S. Pat. No. 3,363,751, 3,701,407 and U.S. Pat. No. 2,331,217. The disadvantage of these designs, however, is that they require additional equipment and cost both to manufacture and maintain. Another disadvantage of the '217 patent design is that use of rollers may damage delicate articles.

What is desired, therefore, is a system for transferring articles directly from a first conveyor section to a second, discontinuously-aligned conveyor section or other surface without the use of either a deadplate which necessitates a clearing step at changeovers, or a third conveying mechanism which increases manufacturing and maintenance costs.

SUMMARY OF THE INVENTION

Accordingly, it is an object of the invention to provide a conveyor system for transferring articles over a discontinuity in a conveyor line without the use of a deadplate or other mechanism.

Another object of the invention is to provide a conveyor system in which first and second discontinuously-aligned conveyor sections may be mounted together for the direct transfer of articles therebetween.

It is a further object of the invention to provide a conveyor system of the above characteristics which includes an extending conveying surface edge.

Still another object of the invention is to provide a conveyor system of the above characteristics in which the extending edge includes a tapered profile.

Yet another object of the invention is to provide a conveyor system of the above characteristics in which the extending edge includes an arcuate profile.

The conveyor system of the present invention comprises a first conveyor having an extending edge with a tapered profile, a second, discontinuously-aligned conveyor, the conveying surface of which is directed below, but in close proximity to, the tapered profile of the first conveyor for the direct transfer of articles therebetween.

Preferably, the edge of the conveying surface is in close proximity to the discontinuously-aligned conveyor so as to minimize the gap therebetween. To avoid interference, and to further minimize the gap, the edge of the first conveying surface has a contour which corresponds to a profile of the surface of the discontinuously-aligned conveyor. Preferably, the contour is that of a curved taper.

The invention and its particular features and advantages will become more apparent from the following detailed description considered with reference to the accompanying drawings.

DETAILED DESCRIPTION OF THE INVENTION

Figure 1:
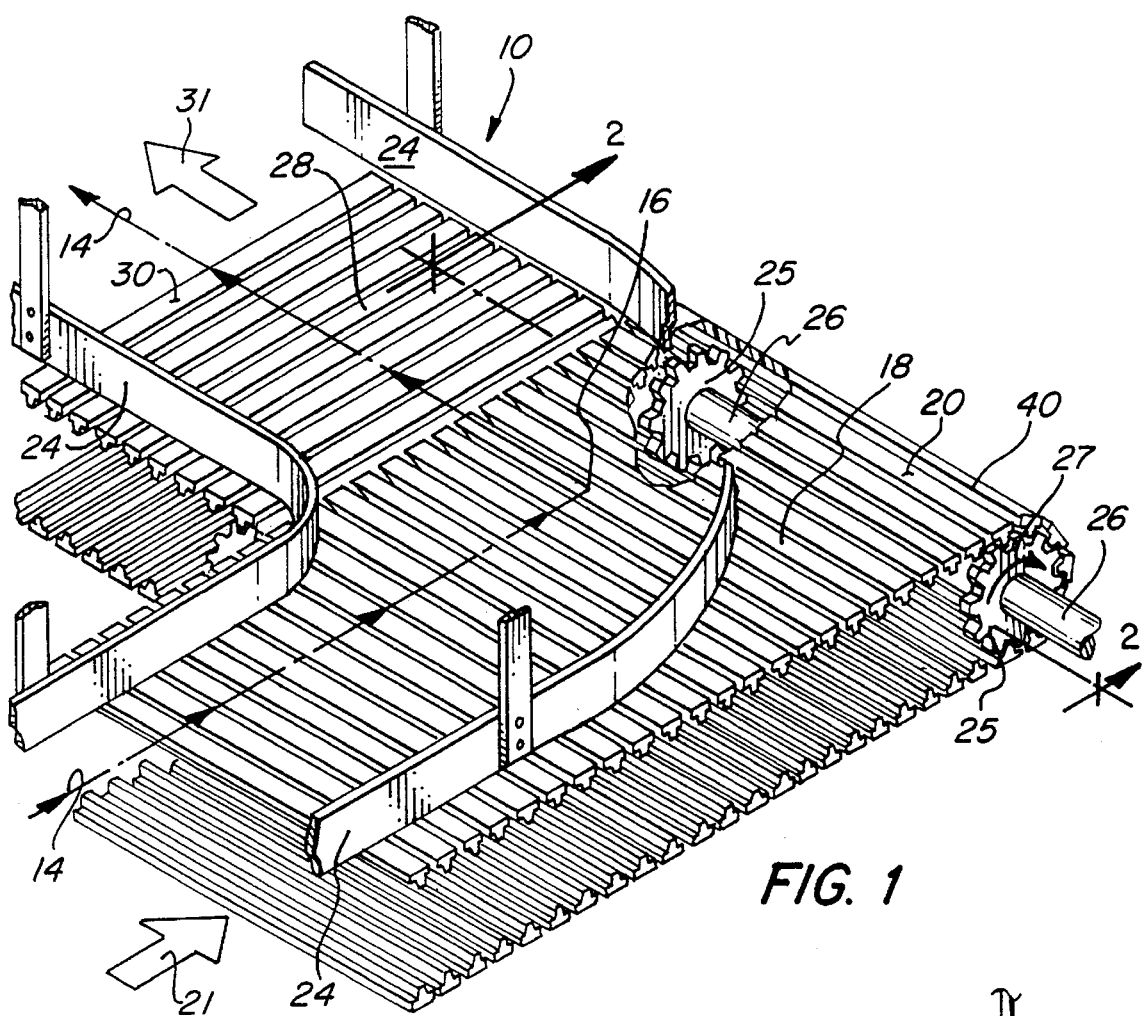
FIG. 1 is an isometric view of an article transfer conveyor system in accordance with the invention partially cutaway to reveal added detail.
Figure 2:
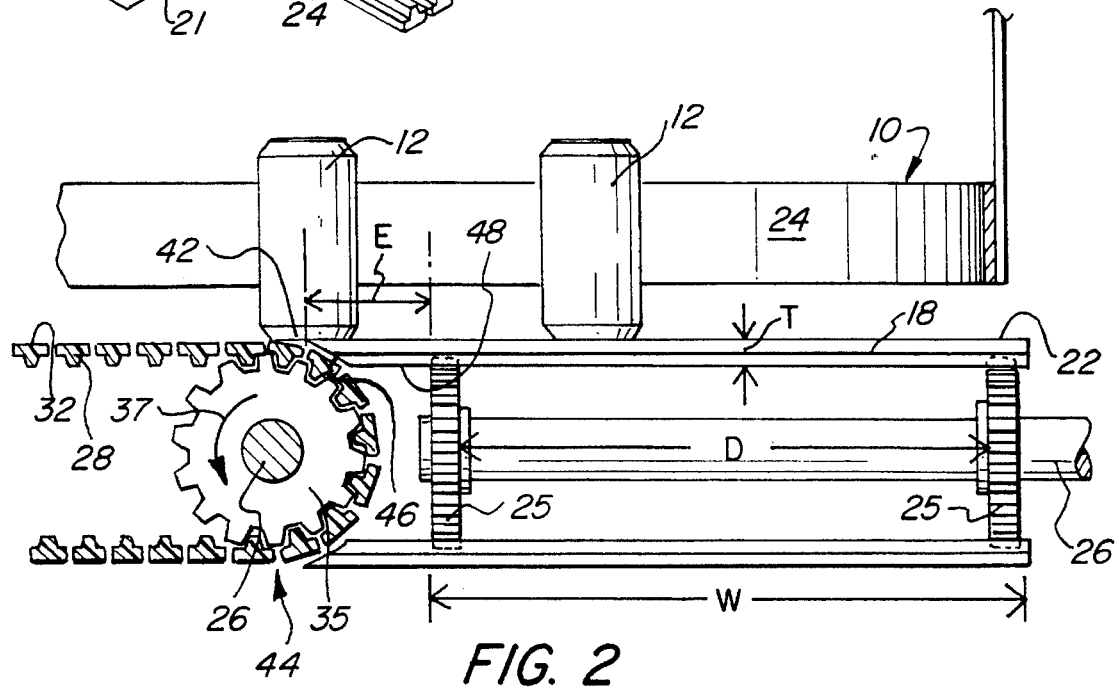
FIG. 2 is a front elevation view of the article transfer conveyor system of FIG. 1 illustrating the close proximity of the extending conveying surface edge to the second conveyor.

FIGS. 1–2 depict a conveyor 10 for moving articles 12 along a conveying path 14 having a discontinuity 16. Conveyor 10 comprises a first conveyor section 18 having a first conveying surface 20 for advancing articles in a first direction indicated by arrow 21, and an adjacent surface 30 over which articles are moved in a second direction indicated by arrow 31. Surface 30 is illustrated as a second conveying surface of a second conveyor section 28, however, it is understood that surface 30 may be any second surface over which articles 12 are moved.

Second direction 31 is not parallel to first direction 21. Conveying path 14 is defined by parallel lines following the direction of advancement of each of the conveyor sections in conveyor 10. By "discontinuity" is meant that articles 12 are moved between two different conveyor sections having non-parallel conveying paths.

Conveying surfaces 20, 30 advance through first and second respective conveying planes 22, 32 (see FIG. 2), which are preferably coplanar, to move articles 12. Although conveying surfaces 20, 30 are illustrated as transverse slat-type conveyors, it is understood that chains, belts, mesh, and other types of slat conveyors may be used without departing from the scope of the invention. Guide rails 24 retain articles 12 on conveying surfaces 20, 30 as they are transferred between first and second conveyor sections 18, 28.

Conveyor sections 18, 28 are endless type conveyors and include pairs of sprockets 25, 35 mounted on axles 26, 36 for supporting and energizing conveying surfaces 20, 30 in the directions indicated by arrows 27, 37. It is understood that other types of conveyor supports and drive mechanisms may be used depending upon the type of conveying surface, and that conveying surfaces 18, 28 may also both be driven in a direction opposite that shown by arrows 27 in which case the direction of conveyor path 14 would also be reversed.

Discontinuities are frequently caused in conveyor path 14 in precisely the situation illustrated in FIGS. 1–2, where a second conveyor section 28 begins near an end 40 (see FIG. 1) of a first conveyor section 18, and where the respective conveying paths of both conveyor sections lie at right angles to one another. Articles 12 are transferred off of first conveyor section 18, over an edge 42 (see FIG. 2) thereof near end 40, across a gap 44 between the first and second conveyor sections, and onto second conveyor section 28. It is understood, however, that second surface 30 need not be near an end of first conveyor section 18 and that the respective conveyor paths may lie in any non-parallel arrangement.

Figure 3:
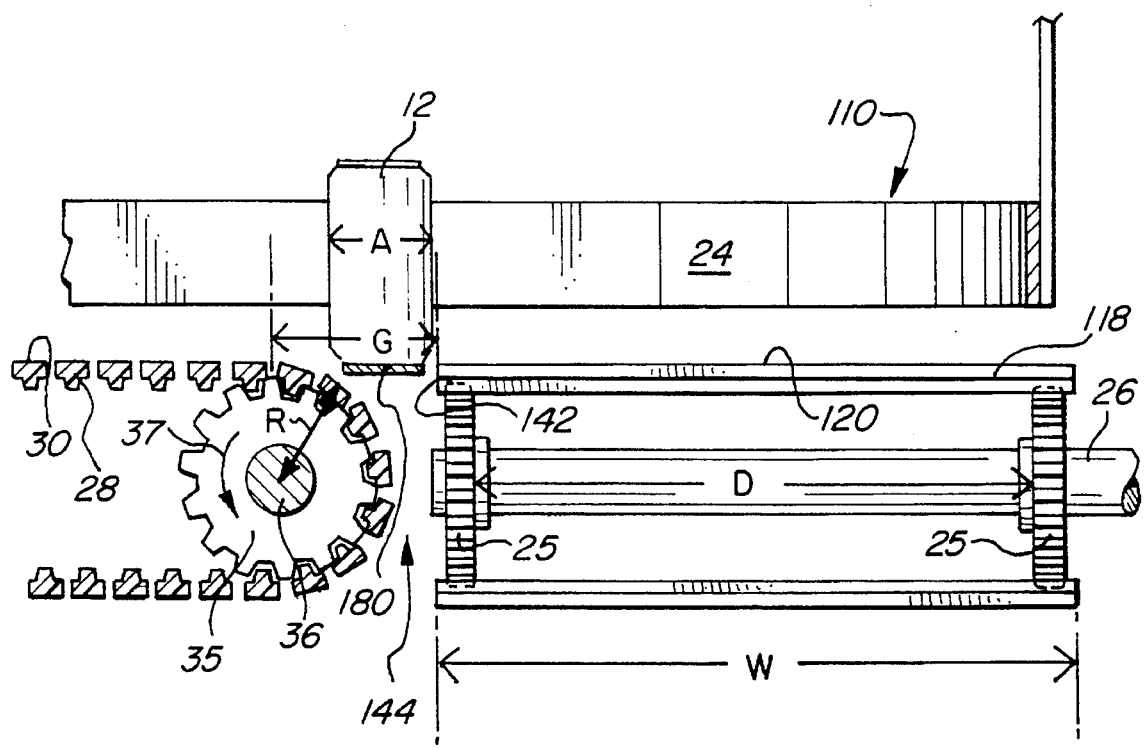
FIG. 3 is a front elevation view of a prior art deadplate arrangement for transferring articles between first and second discontinuously-aligned conveyors.

Referring now to FIG. 3, a prior art conveyor 110 is illustrated for moving articles along path 14 having a discontinuity 16 between a first conveyor section 118 and a second conveyor section 28. In prior art conveyor 110, outermost sprockets 25 or other support or diverting means such as wearstrips are spaced apart by a distance (D) about equal to a width (W) of first conveyor section 118. In this regard, edge 142 of first conveyor section 118 does not extend significantly far beyond outermost sprocket 25 and gap 144 between conveying surface 120 of first conveyor section 118 and conveying surface 30 of second conveyor section 28 is bridged by a deadplate 180.

Gap 144 has a length (G) approximately equal to a radial distance (R) from an axis of shaft 36 to conveying surface 30. Length (G) is frequently larger than an article diameter (A) such that articles 12 may become trapped/stalled on deadplate 180 when conveyor 110 is shut down, e.g., for a label or article changeover on the line.

Returning again to FIGS. 1 and 2, edge 42 of conveyor 10 extends a distance (E) beyond sprocket 25 so that the width of conveying surface 22 is (W+E). Distance (E) is slightly less than gap 144 dimension (G) (see FIG. 3) but is large enough that articles 12 may be transferred there over without a deadplate as shown in FIG. 2.

First conveying surface 18 has a thickness (T) and includes a taper 46 (see FIG. 2) on a lower surface 48 thereof in the region of edge 42 so that second conveying surface 28 can be placed as closely as possible to edge 42 before passing thereunder without touching or otherwise interfering with first conveyor section 18. To move second conveyor section 28 even closer to edge 42, taper 46 is arcuate in cross section such that a surface of the taper conforms to a profile of second conveying surface 30 as it passes around sprocket 35 and is directed beneath first conveying plane 22. It is understood that the shape of taper 46 will depend upon the type of conveying surface used and means such as sprockets, wearstrips or the like used for diverting second conveying surface 28 beneath first conveying plane 22.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A conveyor for transferring articles along a conveying path through a discontinuous turn comprising:

a first conveying surface for moving articles across a first conveying plane between a first position and a discontinuity in the conveying path;

a second conveying surface adjacent said first conveying surface for moving articles across a second conveying plane between the discontinuity and a second position;

means for diverting said second conveying surface below the first conveying plane in a region adjacent the discontinuity; and an edge of said first conveying surface extending toward and over said second conveying surface in the region adjacent the discontinuity to minimize a gap between said first and second conveying surfaces for transferring articles between said first and second conveyor surfaces across the discontinuity.

2. The device of claim 1 wherein said edge is tapered to extend as closely as possible to said second conveying surface without interfering therewith.

3. The device of claim 2 wherein said edge includes an arcuate taper.

4. The device of claim 2 wherein the taper is shaped to match a profile of said second conveying surface.

5. In an endless conveyor including an endless conveying surface and supports for the endless conveying surface, the improvement comprising:

the conveying surface having a width greater than a width of the conveying surface supports and having an edge extending beyond the conveying surface supports; and said extending edge having a taper at its tip enabling the conveyor to be placed in close proximity to a second surface which passes beneath the taper to minimize a gap between said conveying surface and the second surface for transfer of articles between said conveying surface and the second surface without a deadplate or a transfer mechanism.

6. The device of claim 5 wherein the conveying surface supports are axled sprockets.

7. A device for transferring articles between a pair of conveyors which meet in a discontinuous turn comprising:

a first conveyor having a first conveying surface for moving articles along a first conveying plane toward an end of the first conveyor;

a second conveyor adjacent said first conveyor;

means for diverting said second conveyor below said first conveying plane in a region near the end of the first conveyor;

an edge of said first conveying surface extending toward and over said second conveyor in the region near the end of the first conveyor to minimize a gap between said first and second conveyors for transferring articles from said first to said second conveyors.

8. A device as in claim 7 wherein said diverting means comprises an axled sprocket pair which supports said second conveying surface from below.

9. A device as in claim 8 wherein said first edge extends a distance greater than about a radius of a sprocket in said axled sprocket pair.

10. A device as in claim 9 wherein said edge is tapered on its lower surface to bring it as close as possible to the diverted, second conveying surface.

* * * * *